C. J. SIMMONS.
DRILL PRESS.
APPLICATION FILED JAN. 29, 1907.

916,621.

Patented Mar. 30, 1909.

Witnesses
Georgiana Chace
Palmer A. Jones

Inventor
Charles J. Simmons
By Luther V. Moulton
Attorney

UNITED STATES PATENT OFFICE.

CHARLES J. SIMMONS, OF GRAND RAPIDS, MICHIGAN.

DRILL-PRESS.

No. 916,621.  Specification of Letters Patent.  Patented March 30, 1909.

Application filed January 29, 1907. Serial No. 354,730.

*To all whom it may concern:*

Be it known that I, CHARLES J. SIMMONS, a citizen of the United States of America, residing at Grand Rapids, in the county of Kent and State of Michigan, have invented certain new and useful Improvements in Drill-Presses; and I do hereby declare the following to be a full, clear, and exact description of the invention, such as will enable others skilled in the art to which it appertains to make and use the same.

Figure 1:
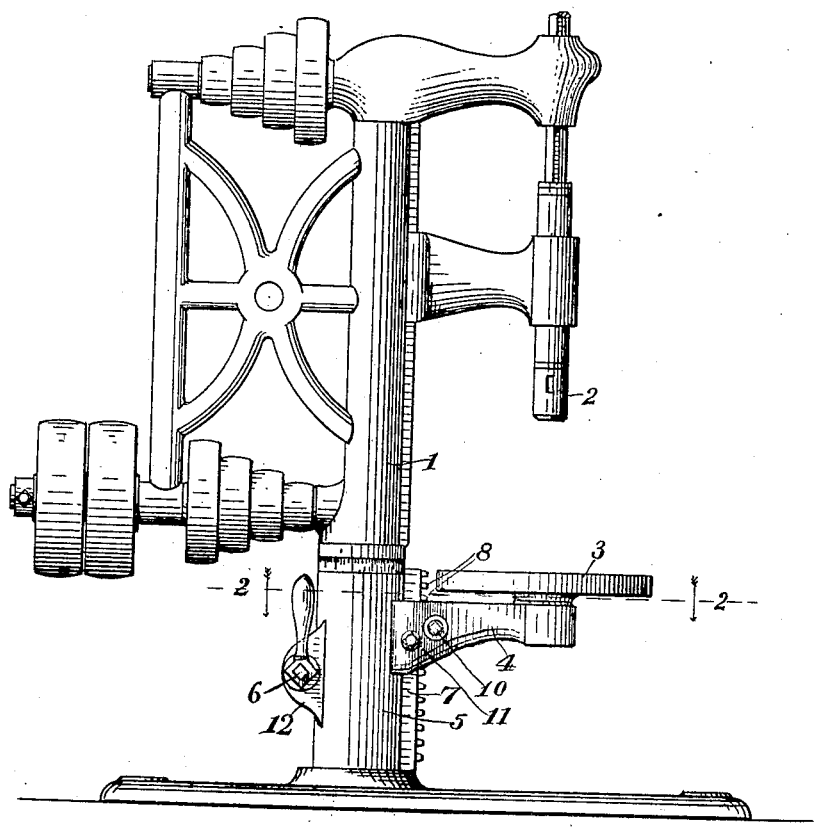
Figure 2:
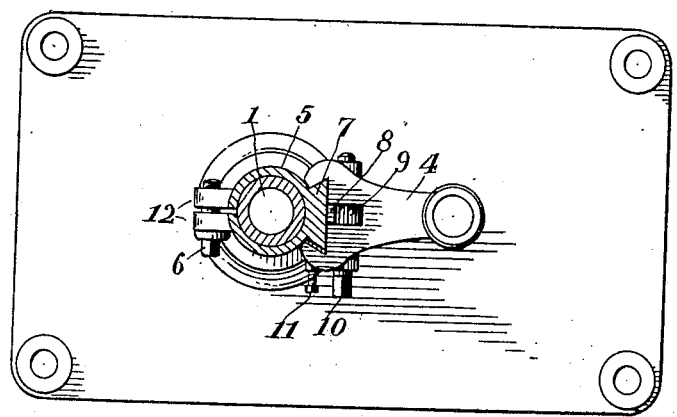

My invention relates to improvements in drill presses, and its object is to provide means whereby the bed on which the work is placed may be adjusted vertically toward and from the spindle, or horizontally about the axis of the column, each adjustment being independent and fixed while the other is released for re-adjustment, and to provide the device with various new and useful features hereinafter more fully described and particularly pointed out in the claim, reference being had to the accompanying drawings, in which:

Figure 1. is a side elevation of a drill press embodying my invention; and, Fig. 2. a horizontal section of the same taken on the line 2—2 of Fig. 1.

Like numbers refer to like parts in both of the figures.

1 represents the column, 2 the spindle and 3 the bed or table of a drill press as usually constructed; 4 is the arm which supports the table, which arm is supported upon a sleeve 5 surrounding the column 1 and rotative about the axis of the same. To hold this sleeve from such rotation it is divided vertically at the rear and provided with a lug 12 at each side of the division, said lugs being connected by a clamping screw 6 whereby the sleeve is clamped upon the column. Extending vertically upon one side of this sleeve is a dove-tail way 7 on which the arm 4 is slidably mounted and vertically adjusted by means of a rack 8 on the front of the way and a pinion 2 mounted on a shaft 10 journaled in the arm 4 and engaging the said rack.

11 is a set screw to fix the arm on the way 7 when adjusted.

13 represents a graduated scale of degrees, whereby the sleeve may be accurately adjusted about the column or returned to a former adjustment as occasion requires. I am thus able to adjust the bed 3 horizontally about the axis of the column without releasing the vertical adjustment of the same, or the said bed may be vertically adjusted without releasing the horizontal adjustment of the same, whereby the position of the work on the bed relative to the spindle will remain unchanged when adjusting the same vertically, or the vertical adjustment remain unchanged when adjusting the bed horizontally.

What I claim is:

In a drill press, a column having a vertical bearing, a sleeve rotatable upon said bearing, said sleeve having a longitudinal projecting guide way, means to prevent accidental rotation of the sleeve, a rack upon the guideway longitudinally of the latter and intermediate the edges of the same, a bifurcated arm embracing the guide-way and adjustable upon the latter, means carried by the arm for engagement with one side of the guide-way to hold the arm in adjusted positions, a shaft mounted transversely of the arm and through the bifurcation of the latter, and a pinion mounted upon said shaft within said bifurcation for mesh with said rack to adjust the arm on the guide-way when the holding means of the latter is released.

In testimony whereof I affix my signature in presence of two witnesses.

CHARLES J. SIMMONS.

Witnesses:
LUTHER V. MOULTON,
GEORGIANA CHACE.